(12) United States Patent
Byma et al.

(10) Patent No.: US 6,379,595 B1
(45) Date of Patent: Apr. 30, 2002

(54) MULTIPLE DENSITY INTERIOR TRIM SUBSTRATE AND METHOD OF MAKING SAME

(75) Inventors: George B. Byma, Haar (DE); Brian A. Cristea, Royal Oak, MI (US); Richard Mühlbacher, Grassau (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/560,233

(22) Filed: Apr. 28, 2000

(51) Int. Cl.$^7$ .......................... B29C 35/02; B32B 31/20
(52) U.S. Cl. ...................... 264/113; 264/112; 264/122; 264/126
(58) Field of Search ................................ 264/112, 113, 264/122, 126

(56) References Cited

U.S. PATENT DOCUMENTS

| | | |
|---|---|---|
| 4,232,788 A | 11/1980 | Roth |
| 4,751,249 A | 6/1988 | Wycech |
| 4,769,391 A | 9/1988 | Wycech |
| 5,093,055 A | 3/1992 | Skiff |
| 5,234,638 A | 8/1993 | Jang |
| 5,242,637 A | 9/1993 | Inoue et al. |
| 5,248,459 A | 9/1993 | Fukasawa et al. |
| 5,271,886 A | 12/1993 | Collom et al. |
| 5,316,149 A | 5/1994 | Tate |
| 5,527,581 A | 6/1996 | Sugawara et al. |
| 5,536,351 A | 7/1996 | Rheinlander et al. |
| 5,700,050 A | 12/1997 | Gonas |
| 5,718,968 A | * 2/1998 | Cutler et al. ................. 156/242 |

FOREIGN PATENT DOCUMENTS

| WO | WO 94/10063 | 5/1994 |
|---|---|---|

* cited by examiner

*Primary Examiner*—Mary Lynn Theisen
(74) *Attorney, Agent, or Firm*—Brooks & Kushman, P.C.

(57) ABSTRACT

The present invention involves a method and system for manufacturing a multiple density substrate for impact energy absorption with a mold having a mold cavity of a predetermined shape. The multiple density substrate is integrally formed by the method comprising providing a first set of unbonded pre-expanded beads having a first density and a second set of unbonded pre-expanded beads having a second density, loading a portion of the mold with the first set of unbonded beads at a predetermined location in the mold sufficiently to leave a void in the mold, and separately injecting the loaded mold portion with a sufficient second set of unbonded beads into the void. The method further includes bonding the first and second sets of beads together with heat to define a molded set of bonded beads having the predetermined shape and cooling the molded set of bonded beads sufficiently to define the multiple density substrate.

20 Claims, 3 Drawing Sheets

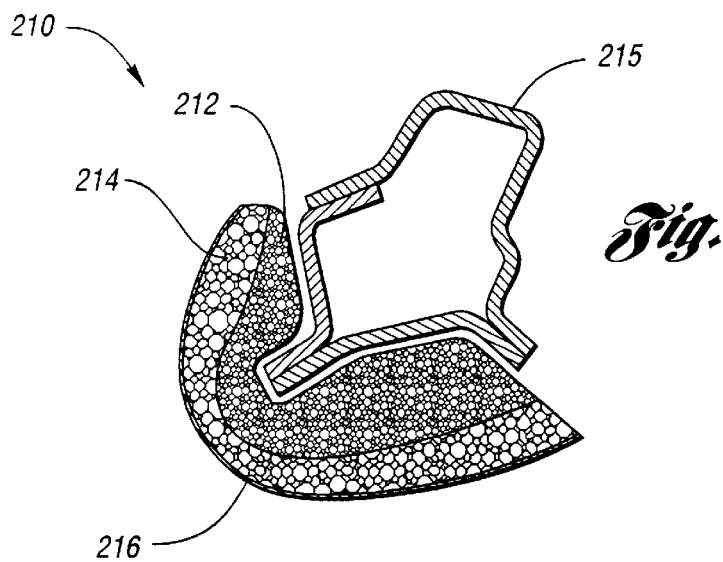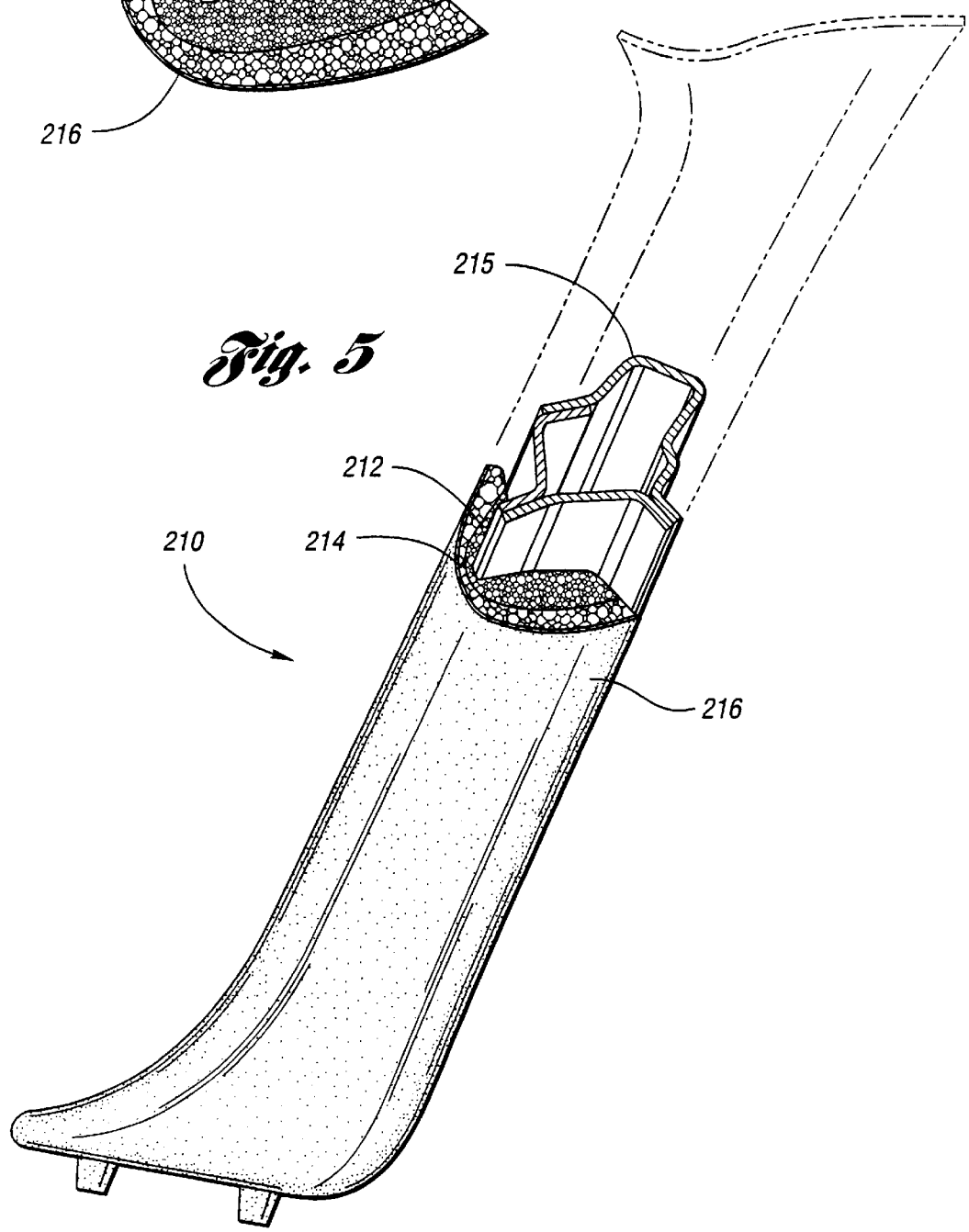

MULTIPLE DENSITY INTERIOR TRIM SUBSTRATE AND METHOD OF MAKING SAME

TECHNICAL FIELD

The present invention relates to a multiple density substrate for selective impact energy absorption, selective structural differences, selective durability, and a method of making the same in vehicles.

BACKGROUND ART

There is a growing need to improve the energy absorption properties of automotive interior trim substrates which also provide structural support to the sheet metal structure of a vehicle. Such sheet metal structures include pillars, side rails, and roof structures. However, the industry has been challenged in determining a cost effective way of manufacturing interior trim substrates and interior components in order to meet industry demands. For example, manufacturers continue to search for ways of improving the properties of substrates for absorbing energy in a cost effective manner while providing structural support.

One challenge that manufacturers are faced with is that energy absorption throughout the passenger compartment, such as on pillars, side rails, or the roof structure of a vehicle, requires different amounts or different densities of energy absorption material, including molded foam or beads. This is due to the vehicle structure design which typically includes a plurality of sheet metal pieces that form the passenger compartment of a vehicle. The thickness and geometric stiffness of the sheet metal typically determine the amount of energy absorption material required. That is, the thicker and/or stiffer the sheet metals is, the more absorption material is required to meet industry demands. Thus, materials of different amounts of energy absorption and/or different densities would be useful to have in interior trim substrates.

Although current energy absorbing parts may be adequate, improvements can be made thereupon. Currently, multi-density component parts are manufactured for energy absorbing purposes. Some multi-density component parts are separately manufactured and then combined to comprise an energy absorbing part which is fastened to an area of a vehicle compartment, such as a pillar. More specifically, single density foam or beads are molded to form a shape of a vehicle component. The molded foam or beads are then attached to a predetermined area on an interior trim material or a shell which then fastens onto the structure of a vehicle. The separate manufacturing processes used in forming the molded foam or beads and the interior trim substrates result in additional manufacturing time and costs.

U.S. Pat. No. 5,700,050 to Gonas discloses an energy absorbing interior automotive trim part. The part has a shell made from polypropylene sections is divided via partitions to extend from the outer wall of the shell. The shell is then filled with structurally engineered energy absorbing foam.

Thus, what is needed is an improved system and method of making an integrally formed substrate that more efficiently meets the industry demands for energy absorption on collision impacts.

DISCLOSURE OF INVENTION

An object of the present invention is to provide for an improved method of manufacturing a multiple density substrate for impact energy absorption with a mold having a mold cavity of a predetermined shape. The method includes providing a first set of unbonded beads of a first density and a second set of unbonded beads of a second density, loading the mold cavity with the first set of unbonded beads at a predetermined location in the mold cavity sufficiently to leave a void in the mold cavity, and separately injecting a sufficient amount of the second set of unbonded beads into the void. The method further includes bonding the first and second sets of beads together with heat to define a molded set of bonded beads having the predetermined shape, and cooling the molded set of bonded beads sufficiently to define the multiple density substrate.

Another object of the present invention is to provide an improved method of manufacturing a multiple density substrate for impact energy absorption with a mold of a predetermined shape. The method includes providing a bag containing a first set of unbonded pre-expanded beads of a first density and providing a second set of unbonded pre-expanded beads of a second density, loading a portion of the mold with the bag including the first set of unbonded beads at a predetermined location on the mold, and injecting the second set of unbonded beads into the mold. The method further includes bonding the first and second set of beads together with heat to define a molded set of bonded beads having the predetermined shape and cooling the molded set of bonded beads sufficiently to define the multiple density substrate.

Another object of the present invention is to provide an improved system for manufacturing a multiple density substrate for differential impact energy absorption with a mold of a predetermined shape, a first set of unbonded beads having a first density, and a second set of unbonded beads having a second density. The system includes a mechanism for loading a portion of the mold with the first set of unbonded beads at a predetermined location in the mold sufficiently to leave a void in the mold, and a mechanism for injecting the loaded mold portion with a sufficient amount of the second set of unbonded beads into the void. The system further includes a mechanism for bonding the first and second sets of beads together with steam to define a molded set of unbonded beads having the predetermined shape.

Yet another object of this invention is to provide for an improved multiple density substrate for impact energy absorption. The substrate is a molded set of bonded beads manufactured by a steam heating process and has a predetermined shape. The substrate comprises a first set of expanded bonded beads of a first density to define a first density level, a second set of expanded bonded beads of a second density integrally disposed adjacent the first set of expanded bonded beads, and a casing device of the first set of expanded bonded beads disposed between the first and second sets to sufficiently separate the first and second density levels to define the multiple density substrate of the predetermined shape.

An improved integrally formed substrate implementing a single method of manufacturing such substrate aids in reducing current manufacturing time and costs. Moreover, integrally formed, multiple density energy absorbing materials aid in improving the manufacture of interior substrates in meeting industry demands to absorb energy on collision impacts while providing adequate support.

Other objects, features, and advantages of the present invention will be apparent from the ensuing description in conjunction with the accompanying drawings.

BRIEF DESCRIPTION OF DRAWINGS

FIG. 4 is a cross-sectional view of a multiple density interior trim substrate formed in accordance with the method of FIG. 3; and FIG. 5 is a cut-away perspective view of the substrate of FIG. 4.

BEST MODE FOR CARRYING OUT THE INVENTION

Figure 1:
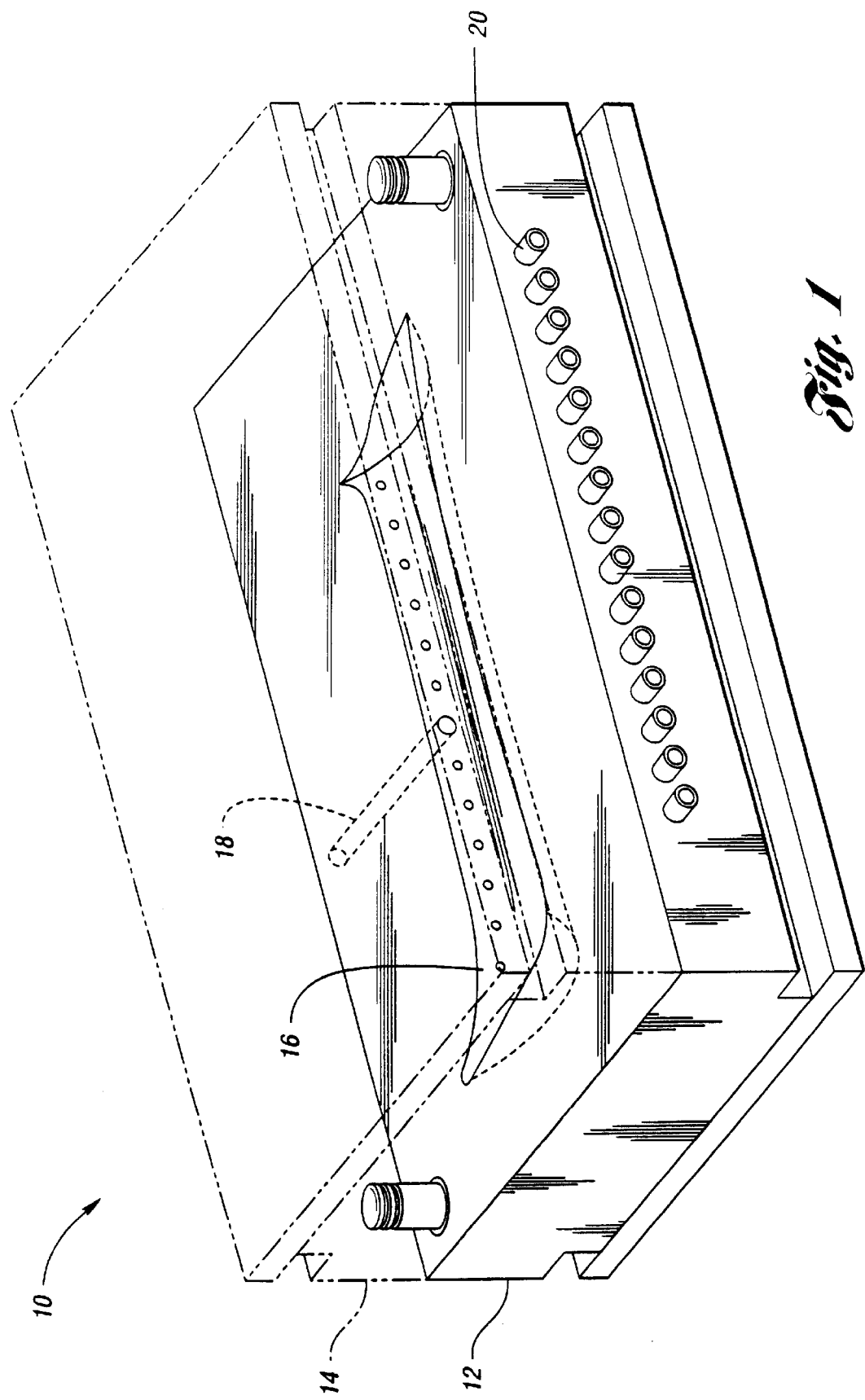
FIG. 1 is a perspective view of a mold drawn partially in phantom which may be used in carrying out the present invention.

FIG. 1 illustrates a mold 10 drawn partially in phantom. Mold 10 may be used for manufacturing a multiple density interior trim substrate in accordance with one embodiment of the present invention. As shown, mold 10 includes lower portion 12 and upper portion 14 (drawn in phantom). Lower portion 12 includes recess or cavity 16 formed thereon. Lower portion also includes injection hole 18 and steam holes 20, as further described below.

Figure 2A:
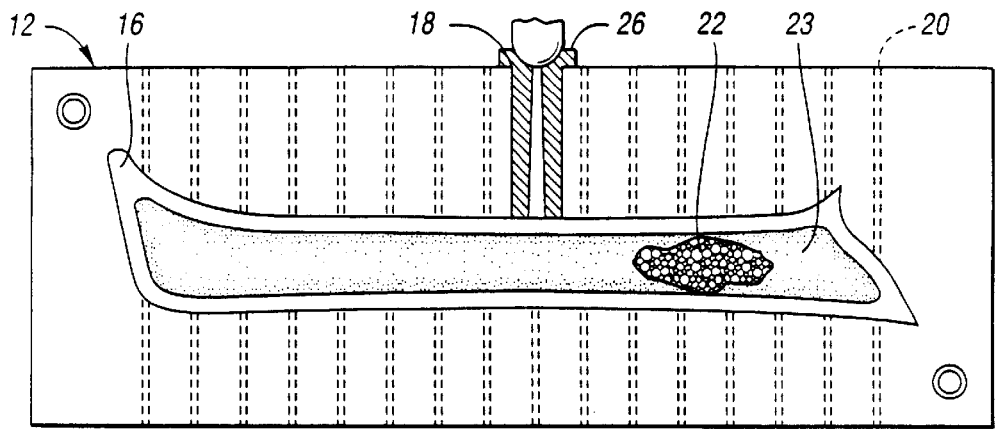
FIG. 2a is a plan view of the mold of FIG. 1 with a cut-away portion to depict a first set of unbonded beads loaded in a recess formed on the mold.
Figure 2B:
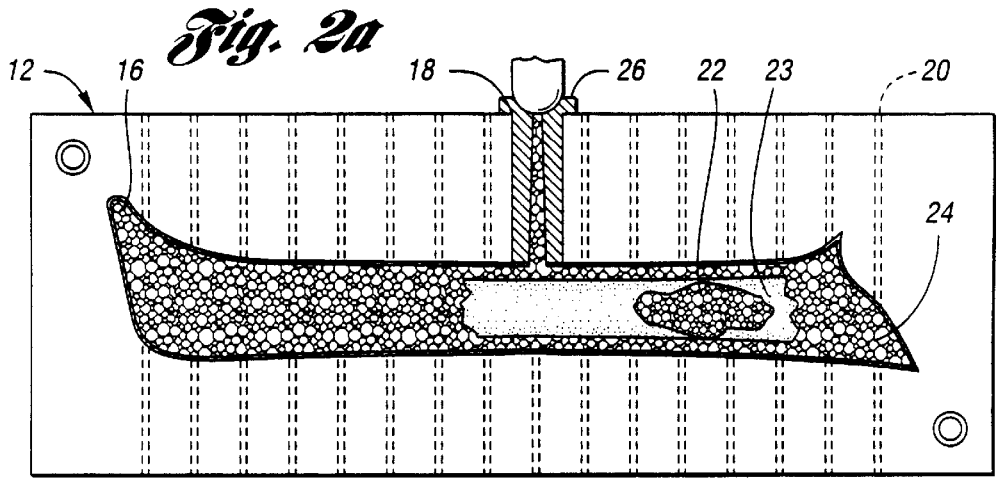
FIG. 2b is a plan view of the mold with a cut-away portion to depict a second set of unbonded beads injected into the recess adjacent the first set of unbonded beads.

FIG. 2a illustrates a plan view of mold 10 in an open position. As shown, first set 22 of pre-expanded unbonded beads is placed in package casing or bag 23 which is loaded into recess 16 to define a first area in which bag 23 occupies. Bag 23 may be loaded into recess 16 automatically, e.g., by robotics, or manually, e.g., by hand. FIG. 2b depicts a second set 24 of pre-expanded unbonded beads which may then be loaded into a remaining portion of recess 16 to define a second area or a void in which bag 23 does not occupy. As further shown in FIGS. 2a and 2b, lower portion 12 includes injection hole 18 through which nozzle 26 may insert. Nozzle 26 injects second set 24 of unbonded beads into mold 10 in a closed position as shown in FIG. 2b. Lower portion 12 further includes steam holes 20 which receive steam lines (not shown) to admit steam to the unbonded beads.

Mold 10 may include conventional controls, plumbing, and moldactuating mechanisms to allow proper operation of lower portion 12 and upper portion 14. For example, portions 12, 14 of mold 10 may be attached to two platens mounted on tie-rods. One platen may be stationary, while the other may be movable to permit opening and closing of portions 12 and 14. Platen actuation may be by hydraulic or air cylinder. Steam may be supplied to mold 10 via conventional manifolding and individual lines.

Figure 3:
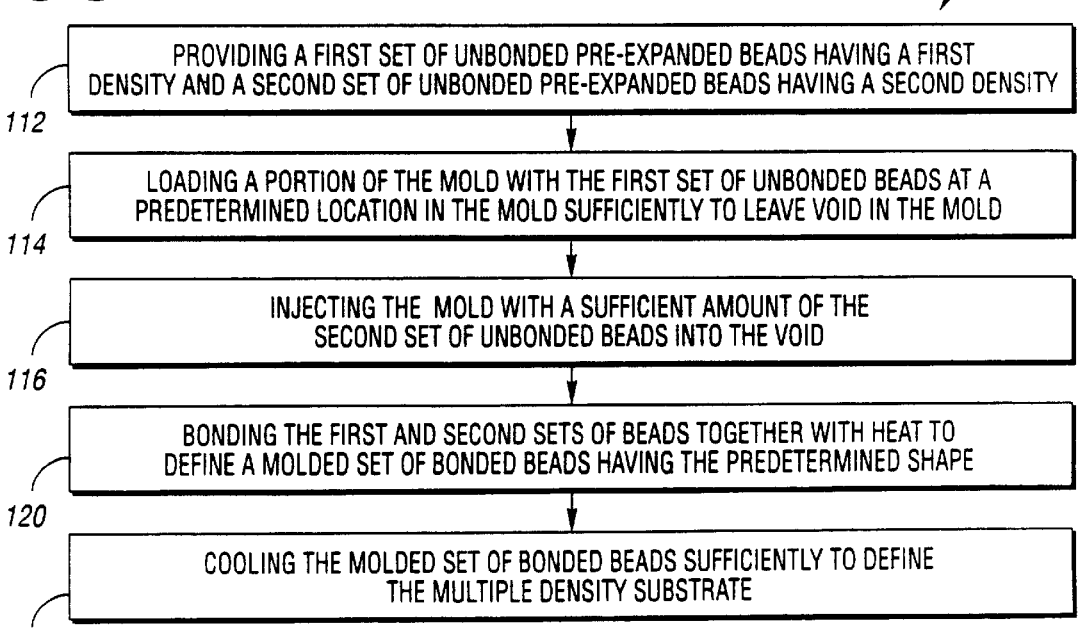
FIG. 3 is a flow chart of one method implemented in making a multiple density interior trim substrate with the mold of FIG. 1.

FIG. 3 illustrates one method 110 implemented to manufacture a multiple density interior trim substrate with mold 10 of FIGS. 2a and 2b. As shown in box 112, the method includes providing the first set 22 of unbonded pre-expanded beads of a first density and the second set 24 of unbonded pre-expanded beads of a second density. In this embodiment, each bead of first set 22 has a greater density than each bead of second set 24. However, each bead of first set 22 may be less than each bead of second set 24. Preferably, densities of the each bead is between 10 kg/m$^3$ and 120 kg/m$^3$.

The beads may be pre-expanded by any suitable means, such as by continuous steam, conveyor and steam chamber, steam pressure chamber (batch), continuous hot air, conveyor/radiant heater, hot water (batch), and oven (batch). In this embodiment, the beads are pre-pressurized with hot compressed air for several hours. The beads used may also include a conductive material, such as carbon powder, to provide the resulting molded part with conductive properties. This may be accomplished by loading bag 23 with beads having a conductive material, e.g., carbon powder. During the admission of steam, the beads will be concentrated at the location at which bag 23 was loaded to provide conductive properties for applications such as heating pads, electrical line, or any other suitable use.

It is to be noted that other beads may be used which would not fall beyond the scope or spirit of the present invention. Other beads may include but are not limited to polyethylene beads, polystyrene beads, other thermoplastic beads and mixtures thereof. Moreover, the beads may have heat expanding components to aid in varying the density between a plurality of set of beads. For example, in one embodiment, the beads may be polystyrene beads having a predetermined amount of a heat expanding component, such as pentane or any other suitable component. A difference in amount of heat expanding component between a plurality of sets of beads provides a difference in density between each bead of each respective set. Additionally, other beads may include the product of the trade name GECET™ manufactured by Huntsman Chemical Corporation of Chesapeake, Va. and the product of the trade name NEOPOLEN-P™ manufactured by BASF Corporation of Wyandotte, Mich. It is also to be noted that the material comprising the beads, e.g., polypropylene, may be recycled material or virgin (non-recycled) material.

In this embodiment, a predetermined amount of the first set 22 of unbonded pre-expanded beads are placed in a package casing, such as a low melt polymer bag. Low melt polymer bag 23 may be made of a polymer, such as polypropylene. As shown in box 114, bag 23 having first set 22 of unbonded beads is then loaded into lower recesses 16. In this embodiment, bag 23 is sized to fit into the first area. However, bag 23 may be larger or smaller in volume to include a greater or lesser amount of beads therein. Thus, bag 23 may be a pre-molded bag of a predetermined shape to fit a certain shape of a recess in a mold. Bag 23 acts to separate set 22 from set 24 during further steps of the method of the present invention.

As mentioned above, portions 12 and 14 are then engaged to close mold 10. One of the portions may be stationary as the other moves to place mold 10 in a closed position. As shown in box 116, second set 24 is injected into mold 10 in its closed position, as shown in FIG. 2b, by conventional air conveying systems. More specifically, second set 24 is injected in mold 10 by nozzle 26 through injection hole 18.

Then, steam may be admitted into mold 10 through steam holes 20 when mold 10 is in its closed position to bond sets 22, 24 of beads together, as shown in box 120. Preferably, the steam is admitted in to mold 10 at 40 to 60 pounds per square inch gauge (psig) and 230° F. for 1.0 to 3.0 minutes and then at 40 to 60 psig and 120° F. for 1.0 to 3.0 minutes. This causes sets 22, 24 of beads to bond together, as shown in box 120, creating an integral molded set. The steam causes further expansion of the beads and forces them to conform to the shape of recess 16. The expanding beads close off steam holes 20 in mold 10, cutting off the admission of steam. In this embodiment, with admitted steam, low melt polymer bag 23 melts to allow contact of sets 22 and 24. However, separation is maintained between first set 22 and second set 24 to define the first and second areas having different densities.

Alternatively, bag 23 may be a mesh bag that sufficiently holds first set 22 of unbonded beads. However, the bag is made of a material in a mesh form to allow second set 24 to partially contact first set 22 through the mesh bag and allow for steam flow therethrough. Mesh bag 23 may be a net or screen formed material having a higher melting point than the polypropylene beads. In this embodiment, mesh bag 23 does not melt during heating of the beads. Thus, mesh bag 23 acts to continually separate first set 22 from second set 24 through heating, yet allow partial contact of sets 22 and 24 in order to sufficiently bond sets 22 and 24 together.

Next, as shown in box 122, the mold with a resulting part or interior trim substrate therein is cooled by water and/or by conventional vacuum techniques (not shown) until the resulting part stabilizes. This is done in order to prevent the part from collapsing by trapped condensing steam during handling of the part. Then, the part is ejected by any suitable means.

As shown in FIGS. 4 and 5, interior trim substrate 210 includes inner portion 212 of the first density and outer portion 214 of the second density. If desired, outer layer 216 may be attached thereto in order to provide a more aesthetic look. Alternatively, outer layer 216 may be placed in mold 10 prior to placing beads in mold 10, eliminating the need of attaching an outer layer after heating. Outer layer 216 may be any conventional show surface material such as polyolefin, vinyl, or other suitable materials. Additionally, although FIGS. 4 and 5 depict inner portion 212 flanking sheet metal structure 215, it is to be noted that portion 212 may be configured adjacent only one side of structure 215, as desired.

One or a plurality of conventional fasteners may be disposed within the mold in order to be bonded to the beads to provide an interior trim substrate having integral fasteners that may be directly attached to the structure of the vehicle. This eliminates the need of adhesives used to glue the fasteners onto the substrate.

It is to be noted that, as areas on a substrate may have different densities, such areas may then have different shades of colors as a result. As desired, the integrally formed multiple density interior trim substrate may have multiple locations rather than multiple layers of different densities without falling beyond the scope or spirit of this invention. For instance, a headliner (not shown) made from the methods of this invention may be formed simply by changing the mold to the shape of the desired headliner having multiple locations in which different sets of beads having different densities may be placed for energy absorption and/or structural purposes.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of manufacturing a multiple density substrate for selective impact energy absorption and structural differences with a mold having a mold cavity of a predetermined shape, the method comprising:

providing a first set of unbonded beads having a first density and a second set of unbonded beads having a second density;

loading the mold cavity with the first set of unbonded beads at a predetermined location in the mold cavity sufficiently to leave a void in the mold cavity;

injecting a sufficient amount of the second set of unbonded beads into the void; and bonding the first and second sets of beads together with steam to define the multiple density substrate having the predetermined shape.

2. The method of claim 1 wherein the unbonded beads are pre-expanded unbonded beads.

3. The method of claim 2 wherein the pre-expanded unbonded beads have an expandable component.

4. The method of claim 1 wherein the sets of beads include a conductive material.

5. The method of claim 1 wherein the first and second densities range between 10 and 120 kilograms per cubic meters.

6. The method of claim 1 wherein the first density is greater than the second density.

7. The method of claim 1 wherein the first density is less than the second density.

8. The method of claim 1 wherein bonding the first and second sets of beads together includes admitting steam into the mold at conditions of between 40 and 60 pounds per square inch at about 230 degrees Fahrenheit for about 1.0 to 3.0 minutes and between 40 and 60 pounds per square inch at about 120 degrees Fahrenheit for about 1.0 to 3.0 minutes.

9. The method of claim 1 wherein the first set of unbonded beads is loaded in the mold, the mold being at an open position.

10. The method of claim 9 wherein the second set of unbonded beads are injected in the mold, the mold being at a closed position.

11. The method of claim 1 further comprising loading a substrate component in the mold prior to loading the first set of unbonded beads.

12. The method of claim 11 wherein the component is a headliner fastener.

13. The method of claim 11 wherein the component is an outer layer of the multiple density substrate.

14. The method of claim 1 further comprising:

cooling the molded set of bonded beads sufficiently to stabilize the multiple density substrate.

15. The method of claim 1 further comprising placing the first set of unbonded beads into a package casing prior to the step of loading to separate the first set from the second set of beads.

16. The method of claim 15 wherein the casing is a low melt polymer bag.

17. The method of claim 16 wherein bonding the first and second sets of beads together with steam includes melting the low melt polymer bag to allow bonding of the beads.

18. The method of claim 15 wherein the casing is a mesh bag having a higher melting point than the first set and the second set of beads.

19. The method of claim 18 wherein bonding the first and second sets of beads together with steam includes bonding the first and second sets of beads through the mesh bag.

20. A method of manufacturing a multiple density substrate for impact energy absorption with a mold having a mold cavity of a predetermined shape, the method comprising:

providing a bag including a first set of unbonded pre-expanded beads of a first density and providing a second set of unbonded pre-expanded beads of a second density;

loading the mold cavity with the bag including the first set of unbonded beads at a predetermined location in the mold cavity;

injecting the second set of unbonded beads into the mold cavity;

bonding the first and second set of beads together with heat to define a molded set of bonded beads having the predetermined shape; and cooling the molded set of bonded beads to define the multiple density substrate.

* * * * *